Patented Oct. 2, 1923.

1,469,586

UNITED STATES PATENT OFFICE.

RALPH A. NELSON, OF BUFFALO, NEW YORK, ASSIGNOR TO NATIONAL ANILINE & CHEMICAL COMPANY, INC., OF NEW YORK, N. Y., A CORPORATION OF NEW YORK.

PRODUCTION OF HYDRAZANISOL.

No Drawing. Application filed June 5, 1920. Serial No. 386,714.

*To all whom it may concern:*

Be it known that I, RALPH A. NELSON, a citizen of the United States, residing at Buffalo, in the county of Erie, State of New York, have invented certain new and useful Improvements in the Production of Hydrazanisol; and I do hereby declare the following to be a full, clear, and exact description of the invention, such as will enable others skilled in the art to which it appertains to make and use the same.

This invention relates to the production and isolation of hydrazanisol in a crystalline state.

In the production of hydrazanisol, by the reduction of o-nitranisol, it has heretofore been proposed to separate the hydrazanisol crystals from the reducing agents admixed therewith by dissolving out the reducing agents with acid. Where the o-nitranisol is reduced by zinc and caustic soda, the hydrazanisol crystals produced are admixed with the zinc oxide and other products of reaction of the zinc and caustic. The treatment of this product with acid results in dissolving out the zinc residue and in the neutralization of any remaining caustic. The alkali is thus lost and it requires a corresponding amount of acid for its neutralization while the zinc similarly requires acid for its solution and removal. It is moreover difficult to effect this extraction of the zinc residue by acid without at the same time converting a part of the hydrazanisol crystals into dianisidin.

According to the present invention, the disadvantages and objections of such prior processes are largely avoided and the hydrazanisol is obtained directly in a crystalline state relatively free from admixed zinc residue.

The present invention is based upon the discovery that by observing proper conditions, the hydrazanisol can be converted into a crystalline state with crystals of an appropriate size and character such that they can be directly separated from the zinc residue by a sieving operation.

The invention will be further illustrated by the following specific example, the parts being by weight:

30 parts of o-nitranisol, about 27 parts of denatured alcohol, and about 5 parts of caustic soda of 35 to 43° Bé. are mixed together and brought to a boil under a reflux condenser. The mixture is agitated vigorously and 40 parts of zinc dust are added gradually and in small amounts and at such intervals as to keep up a vigorous refluxing of the alcohol. This may require several hours, depending upon the rate of reaction. When all the zinc has been added, the mass is heated and the refluxing is continued until the reaction is completed, which is indicated by the change in color of the reduction mass to a light gray.

The reduction mass is then allowed to cool very slowly, while shaking or agitating to allow the growth of the crystals of hydrazanisol to take place from the saturated alcohol solution. When the mass is cooled to room temperature, it is diluted with water, well agitated, and passed over a screen of suitable mesh, about 100-mesh. By running water over the mass, the zinc residue is washed away and passes through the screen, leaving the hydrazanisol crystal upon the screen, substantially free from zinc. Crystals have thus been obtained quite large in size, colorless, sharp and hard, and with excellent yields.

The reduction of the o-nitranisol can be otherwise effected than by the process specifically described above. For example, it can advantageously be carried out with intermittent addition of the zinc and caustic in the manner more particularly described and claimed in application Serial No. 390884, filed June 22, 1920, and the hydrazanisol crystals can then be isolated from the reduction mass in a similar manner to that above described.

I claim:

1. The method of producing and isolating hydrazanisol, which comprises subjecting o-nitranisol to reduction with zinc and caustic alkali in the presence of alcohol at a boiling temperature, slowly cooling the reduction mass while shaking or agitating and thereby permitting the growth of hydrazanisol crystals, admixing the resulting product with water and separating the crystals from the zinc residue by a sieving operation.

2. The method of separating hydrazanisol, which comprises subjecting a reduction mixture, containing an alcohol solution of the hydrazanisol admixed with zinc residue, to slow cooling, with agitation, to permit the growth of hydrazanisol crystals, and separating the resulting crystals from the zinc residue by a sieving operation.

3. The method of effecting the separation of hydrazanisol from a solution thereof admixed with a finely divided residue, which comprises slowly cooling the solution with agitation to permit the growth of hydrazanisol crystals, and separating the resulting crystals from the finely divided residue by a sieving operation.

In testimony whereof I affix my signature.

RALPH A. NELSON.